United States Patent
Efimov

(10) Patent No.: US 8,045,861 B1
(45) Date of Patent: Oct. 25, 2011

(54) METHOD AND SYSTEM FOR SPECTRAL SUPPRESSION OF NOISE IN A COMMUNICATION SIGNAL

(75) Inventor: Oleg M. Efimov, Thousand Oaks, CA (US)

(73) Assignee: HRL Laboratories, LLC, Malibu, CA (US)

(*) Notice: Subject to any disclaimer, the term of this patent is extended or adjusted under 35 U.S.C. 154(b) by 734 days.

(21) Appl. No.: 11/561,276

(22) Filed: Nov. 17, 2006

(51) Int. Cl.
*H04B 10/00* (2006.01)

(52) U.S. Cl. .................. 398/159; 398/158; 398/208

(58) Field of Classification Search .......... 398/158–161, 398/182–201, 202–214
See application file for complete search history.

(56) References Cited

U.S. PATENT DOCUMENTS

| | | | |
|---|---|---|---|
| 5,533,133 A | 7/1996 | Lamkin et al. | |
| 5,696,707 A * | 12/1997 | Hentschel et al. | 702/69 |
| 5,706,126 A * | 1/1998 | Fujita | 359/341.42 |
| 5,796,479 A * | 8/1998 | Derickson et al. | 356/326 |
| 5,969,834 A * | 10/1999 | Farber et al. | 398/34 |
| 6,204,959 B1 * | 3/2001 | Fujita et al. | 359/337.2 |
| 6,259,529 B1 * | 7/2001 | Sorin et al. | 356/484 |
| 6,396,051 B1 * | 5/2002 | Li et al. | 250/227.18 |
| 6,396,574 B1 * | 5/2002 | Lee et al. | 356/73.1 |
| 6,433,864 B1 * | 8/2002 | Chung et al. | 356/73.1 |
| 6,643,011 B2 * | 11/2003 | Kojima | 356/300 |
| 6,704,511 B1 * | 3/2004 | Kerfoot et al. | 398/85 |
| 6,839,131 B2 * | 1/2005 | Kwon | 356/73.1 |
| 6,865,276 B1 | 3/2005 | Ljungberg et al. | |
| 6,903,324 B2 * | 6/2005 | Tomofuji et al. | 250/214 LA |
| 6,977,731 B1 * | 12/2005 | Lee et al. | 356/519 |
| 6,977,772 B2 * | 12/2005 | Yoshida | 359/341.41 |
| 7,162,165 B2 * | 1/2007 | Szafraniec | 398/202 |
| 7,177,074 B2 * | 2/2007 | Rapp | 359/341.43 |
| 7,391,970 B2 * | 6/2008 | Lee et al. | 398/26 |
| 7,526,201 B2 * | 4/2009 | Mohs et al. | 398/37 |
| 2004/0052533 A1 | 3/2004 | He et al. | |
| 2005/0232627 A1 * | 10/2005 | Sun et al. | 398/26 |

OTHER PUBLICATIONS

Kogelnik, Herwig. "*Coupled Wave Theory for Thick Hologram Gratings.*" The Bell System Technical Journal, Nov. 1969, vol. 48, No. 9, pp. 2909-2947.

"*Optical Fiber Amplifiers: Materials, Devices and Applications.*" S. Sudo, editor, Artech House Inc., 1999, p. 420.

* cited by examiner

*Primary Examiner* — Agustin Bello

(74) *Attorney, Agent, or Firm* — Christie, Parker, Hale

(57) ABSTRACT

A method and system for spectral suppression of a noise in a communication signal. The method includes transmitting a communication signal through a plurality of rejection filters to create a plurality of spectral holes over a spectrum of the communication signal. The communication signal with an acquired noise is received. Noise intensities of the acquired noise at the plurality of spectral holes are measured, and the acquired noise over the spectrum of the communication signal is calculated. The acquired noise is subtracted from the communication signal with the acquired noise.

20 Claims, 9 Drawing Sheets

METHOD AND SYSTEM FOR SPECTRAL SUPPRESSION OF NOISE IN A COMMUNICATION SIGNAL

FIELD OF THE INVENTION

The present invention relates to spectral suppression of noise in communication systems.

BACKGROUND OF THE INVENTION

Systems and methods for noise suppression are necessary components and/or applications in many communication systems including those using radio frequency (RF) technologies and/or optical technologies.

In particular, a simple approach for noise suppression in a communication system is disclosed in U.S. Pat. No. 5,533,133, which is incorporated by reference herein in its entirety. This approach proposed to suppress the noise during pauses and silent periods in a conversation. The approach does not allow for noise subtraction from a received signal and it provides just perceptibly improved quality of communication.

An approach for actual noise suppression of a communication signal in a communication system was proposed in U.S. Pat. No. 6,865,276, which is incorporated by reference herein in its entirety. This method for noise suppression suppresses a disturbance signal using a priori information about a fundamental frequency of the disturbance signal to generate an estimate of this disturbance signal. This estimated disturbance signal is subtracted from the communication signal. The basic drawback of this method is that it is necessary to have a priori information about the noise to suppress the noise.

Another approach for noise suppression of a communication signal in a communication system was proposed in U.S. Patent Publication No. 2004/0052533, which is incorporated by reference herein in its entirety. Specifically, referring now to FIG. 1, the approach proposed using a system for noise suppression in optical communication which includes two transmitters operating at two different wavelength. One of the transmitters (Data A in FIG. 1) is used to send an information signal and the other one (1 in FIG. 1) is used to send a stable reference signal. For noise suppression, the approach proposed to extract the noise from the reference signal and than subtract it from the information signal supposing that both signals acquired similar noise during propagation. The basic disadvantage of this approach is that in reality, the spectral density of noise depends on wavelength; therefore, the subtraction of noise measured at one wavelength from a received signal measured at another wavelength can give good result only for some special communication systems. However, in a typical communication system, for example in a broadband communication signal application (using short laser pulses and/or conventional multichannel WDM/DWDM technologies), this approach does not provide for good noise suppression because of the spectral dependences of noise.

It is therefore desirable to provide a system and method for suppression of noise in communication system that overcomes the above-described shortcomings while retaining their advantages. In particular, it would be desirable to provide a system and method that can realize spectral suppression of noise in communication systems.

SUMMARY OF THE INVENTION

An aspect of the present invention provides a method for spectral suppression of noise in communications systems to facilitate accurate reception of signals under heavy noise conditions.

Another aspect of the present invention provides a method for noise suppression in multi-channel communication at different communication wavelength intervals.

Another aspect of the present invention provides a system for spectral suppression of a noise in a communication signal.

In one embodiment of the present invention, a method for spectral suppression of a noise in a communication signal includes transmitting a communication signal through a plurality of rejection filters to create a plurality of spectral holes over a spectrum of the communication signal. The communication signal with an acquired noise is received. Noise intensities of the acquired noise at the plurality of spectral holes are measured, and the acquired noise over the spectrum of the communication signal is calculated. The acquired noise is subtracted from the communication signal with the acquired noise.

The spectrum of the acquired noise may be restored using the measured noise intensities as reference points of the spectrum of the acquired noise.

The spectrum of the acquired noise may be restored using a linear interpolation technique.

The measuring of the noise intensities may include passing the communication signal with the acquired noise through a plurality of selecting filters.

The plurality of selecting filters may have spectra centers substantially corresponding to spectra centers of the plurality of rejection filters.

The noise intensities may be measured using a plurality of detectors adapted to measure the noise intensities inside the spectral holes where the communication signal is absent.

The method may include measuring the communication signal with the acquired noise after receiving the communication signal with the acquired noise. The spectrum of the acquired noise is restored using the measured noise intensities as a plurality of reference points of the spectrum of the acquired noise. The plurality of reference points includes a starting point and an ending point, and the communication signal is measured as a single spectral interval from the starting point to the ending point.

The method may include measuring the communication signal with the acquired noise after receiving the communication signal with the acquired noise. The communication signal is measured in a plurality of spectral intervals by passing the communication signal through a plurality of filters.

The method may include calculating values of the acquired noise inside each of the plurality of spectral intervals.

The subtracting the acquired noise from the communication signal with the acquired noise may include subtracting the values of the acquired noise inside each of the plurality of spectral intervals from corresponding values of the communication signal inside each of the plurality of spectral intervals.

The method may include measuring the communication signal with the acquired noise after receiving the communication signal with the acquired noise. The measuring of the noise intensities includes passing the communication signal with the acquired noise through a plurality of narrowband selecting filters. The measuring of the communication signal includes passing the communication signal with the acquired noise through a plurality of filters higher in bandwidth than the plurality of narrowband selecting filters.

Each of the plurality of the rejection filters may be a narrowband filter.

The plurality of rejection filters may include a plurality of Bragg gratings.

In one embodiment of the present invention, a method for noise suppression in multi-channel communication at different communication wavelength intervals includes transmitting each of a plurality of communication signals at different wavelengths separated by a plurality of wavelength intervals through at least one rejection filter to create at least one spectral hole over a spectrum of each of the communication signals. Each of the communication signals with an acquired noise is received. At least one noise intensity of the acquired noise at the at least one spectral hole is measured. The acquired noise over the spectrum of each of the communication signals is measured, and the acquired noise is subtracted from each of the communication signals with the acquired noise.

In one embodiment of the present invention, a system for spectral suppression of a noise in a communication signal includes a plurality of rejection filters and a transmitter adapted to transmit a communication signal through the plurality of rejection filters to create a plurality of spectral holes over a spectrum of the communication signal.

The system may include a plurality of narrowband selecting filters adapted to receive the communication signal with an acquired noise and to select portions of the acquired noise from the communication signal with the acquired noise.

The plurality of narrowband selecting filters may have spectra centers substantially corresponding to spectra centers of the plurality of rejection filters.

The system may include a plurality of filters higher in bandwidth than the plurality of narrowband selecting filters, wherein the communication signal is measured in a plurality of spectral intervals by passing the communication signal through the plurality of filters higher in bandwidth than the plurality of narrowband selecting filters.

The system may include a plurality of detectors adapted to receive the communication signal with an acquired noise and to measure noise intensities inside the spectral holes where the communication signal is absent.

The plurality of the rejection filters may include a plurality of Bragg gratings.

In an embodiment of the present invention, a system for spectral suppression of a noise in a communication signal includes a part for receiving a communication signal having a plurality of spectral holes over a spectrum of the communication signal. The system also includes a part for measuring noise intensities of an acquired noise at the plurality of spectral holes and a part for calculating of the acquired noise over the spectrum of the communication signal. The system also includes a part for subtracting the acquired noise from the communication signal.

In an embodiment of the present invention, a method for noise suppression in multi-channel communication at different communication wavelength intervals includes transmitting each of a plurality of communication signals at different wavelengths separated by a plurality of wavelength intervals. The plurality of wavelength intervals are used as a plurality of spectral holes. Each of the communication signals with an acquired noise is received. At least one noise intensity of the acquired noise at the at least one spectral hole is measured. The acquired noise over the spectrum of each of the communication signals is measured. The acquired noise is subtracted from each of the communication signals with the acquired noise.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

Figure 1:
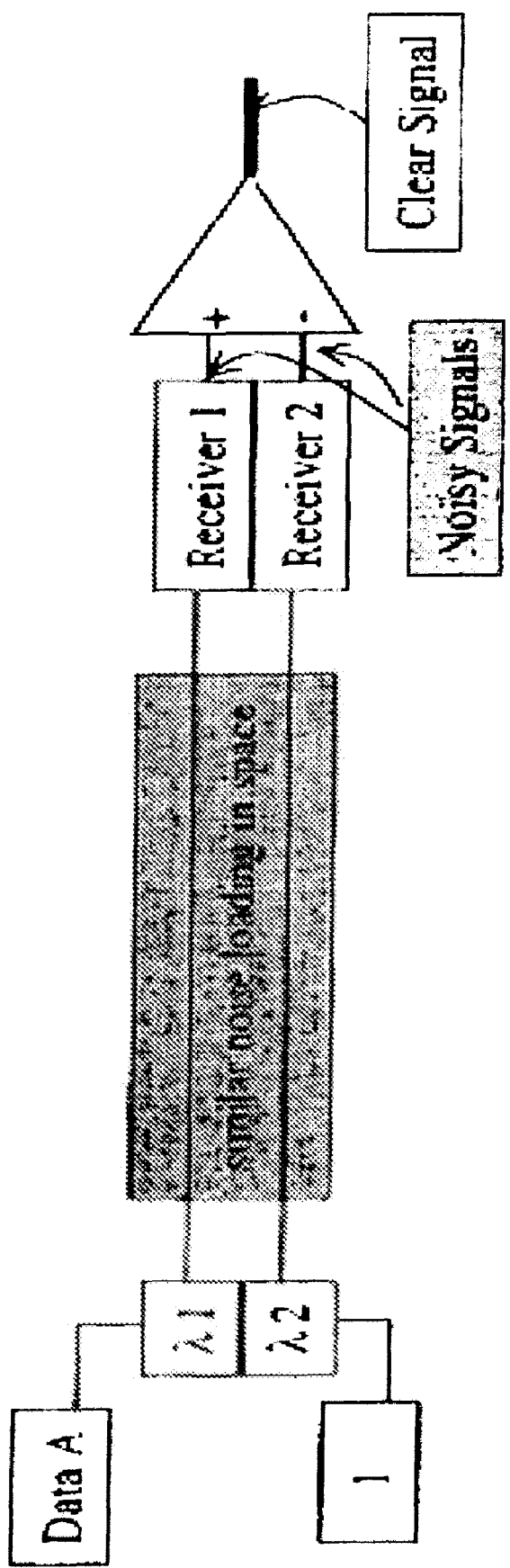
FIG. 1 shows a conventional system for noise suppression in an optical communications system.
Figure 2:
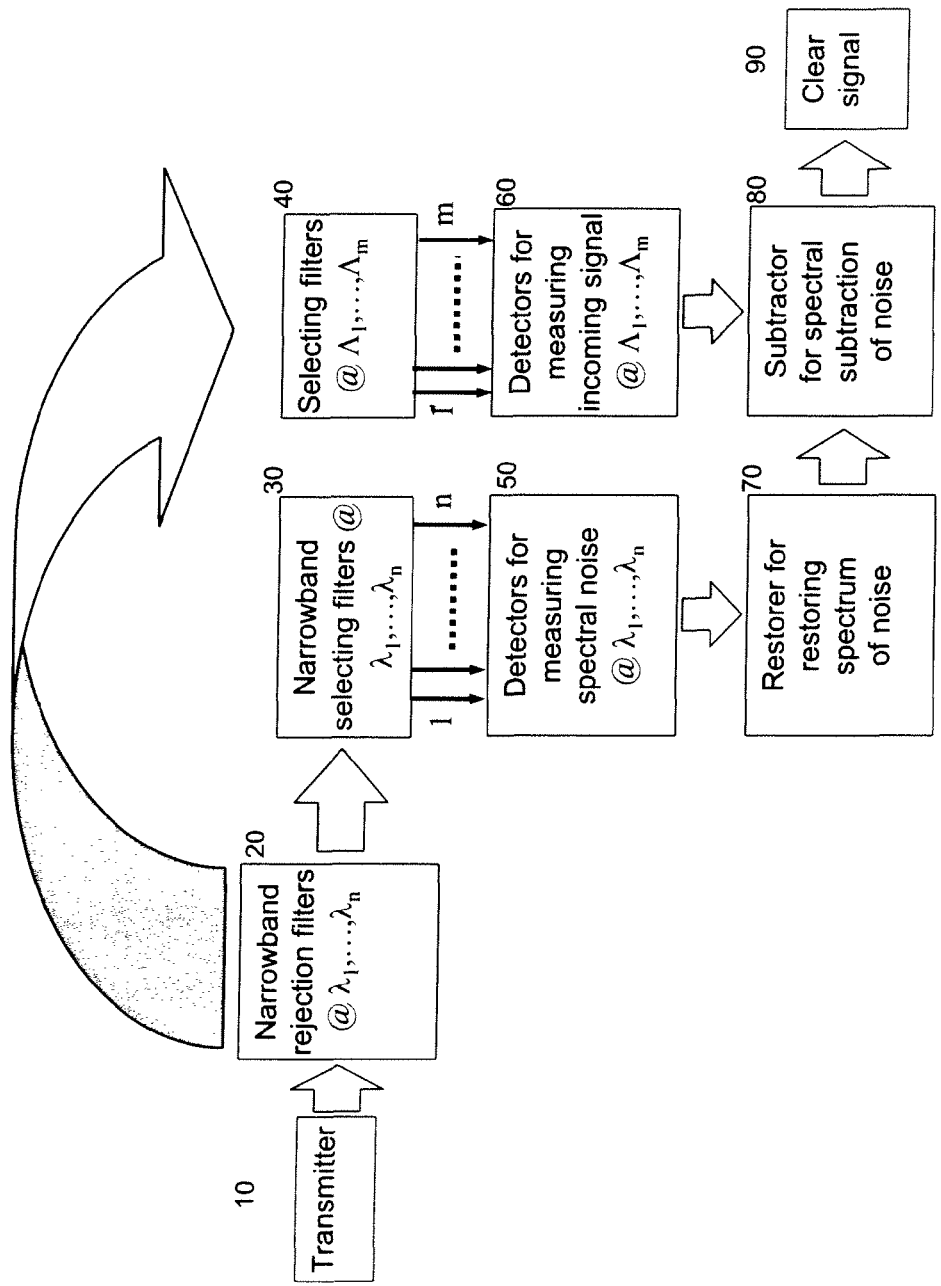
FIG. 2 shows a system for noise suppression in a communications system according to an embodiment of the present invention.
Figure 3:
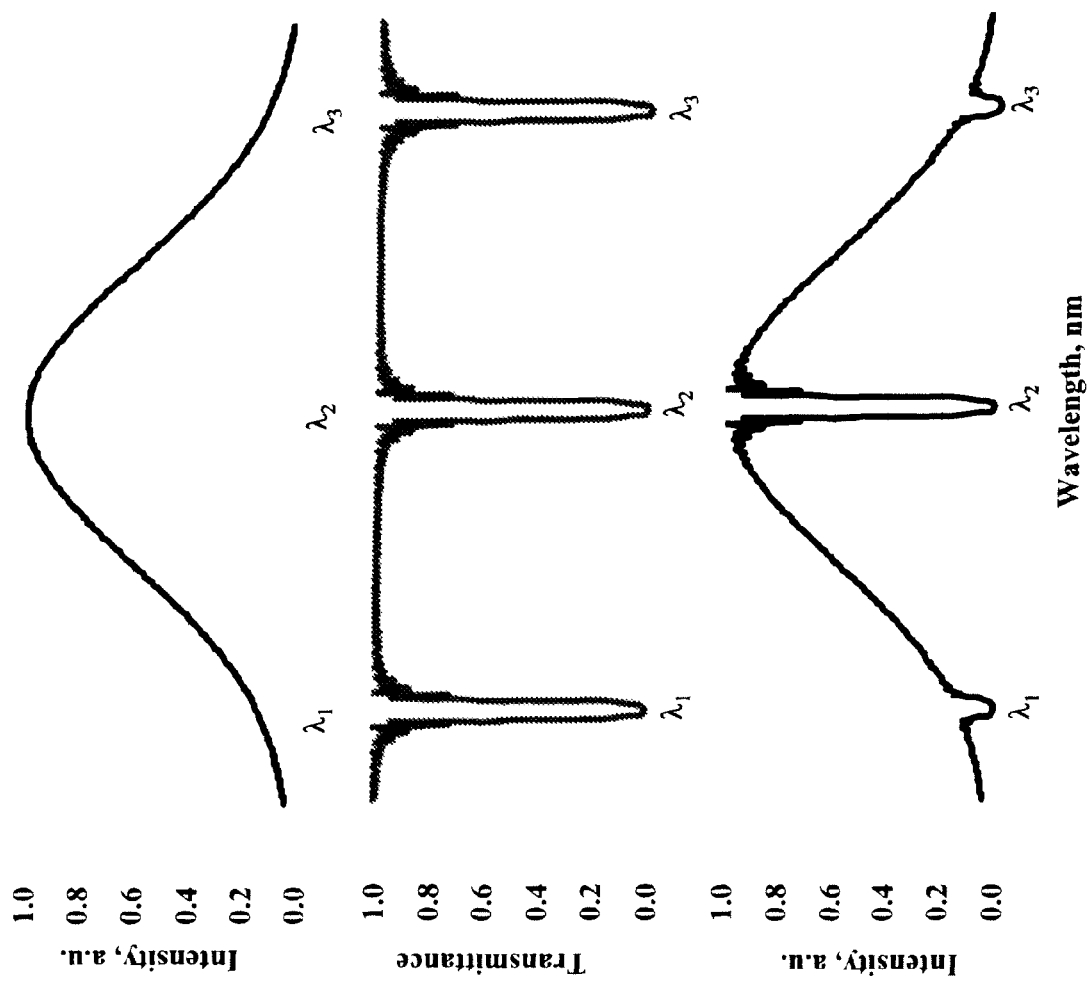
FIG. 3a shows a spectrum of a communication signal to be transmitted and received by the system shown in FIG. 2.
FIG. 3b shows a combined wavelength response of narrowband rejection filters shown in FIG. 2.
FIG. 3c shows a spectrum of the communication signal as filtered by the narrowband rejection filters.

Referring to FIG. 2, a communication signal having a spectrum (see, for example, FIG. 3a) is output by a transmitter 10. The communication signal is then input to a plurality of rejection filters 20 having a combined wavelength response over the spectrum (see, for example, FIG. 3b). The rejection filters 20 are adapted to reject (e.g., substantially attenuate) signal content of (or about) certain wavelengths. Signal content that is rejected are of wavelengths respectively corresponding to spectra centers of the rejection filters 20. Here, the rejection filters 20 are also adapted not to substantially reject signal content of other wavelengths. That is, the other signal content corresponding to the other wavelengths are passed by the rejection filters 20 substantially unaltered. As shown in FIG. 3b, the rejection filters 20 are adapted to reject signal content of wavelengths $\lambda_1$, $\lambda_2$, and $\lambda_3$. Signal content of wavelengths other than $\lambda_1$, $\lambda_2$, and $\lambda_3$ are passed by the rejection filters 20 substantially unaltered.

In one embodiment of the present invention, each of the rejection filters 20 is a narrowband filter. In one embodiment of the present invention, the rejection filters may include thick Bragg gratings. In general, Bragg gratings are configured to reflect certain optical wavelengths and to transmit other wavelengths. Wavelengths that are reflected by the Bragg gratings are thereby rejected.

The rejection filters 20 thereby output a filtered communication signal having a corresponding spectrum (see, for example, FIG. 3c). The spectrum of the filtered communication signal has spectral holes. The spectral holes correspond to wavelengths that were rejected by the rejection filters 20. As shown in FIG. 3c, the filtered communication signal has spectral holes at wavelengths $\lambda_1$, $\lambda_2$, and $\lambda_3$. The filtered communication signal is then propagated through an environment in which noise is present.

Figure 4:
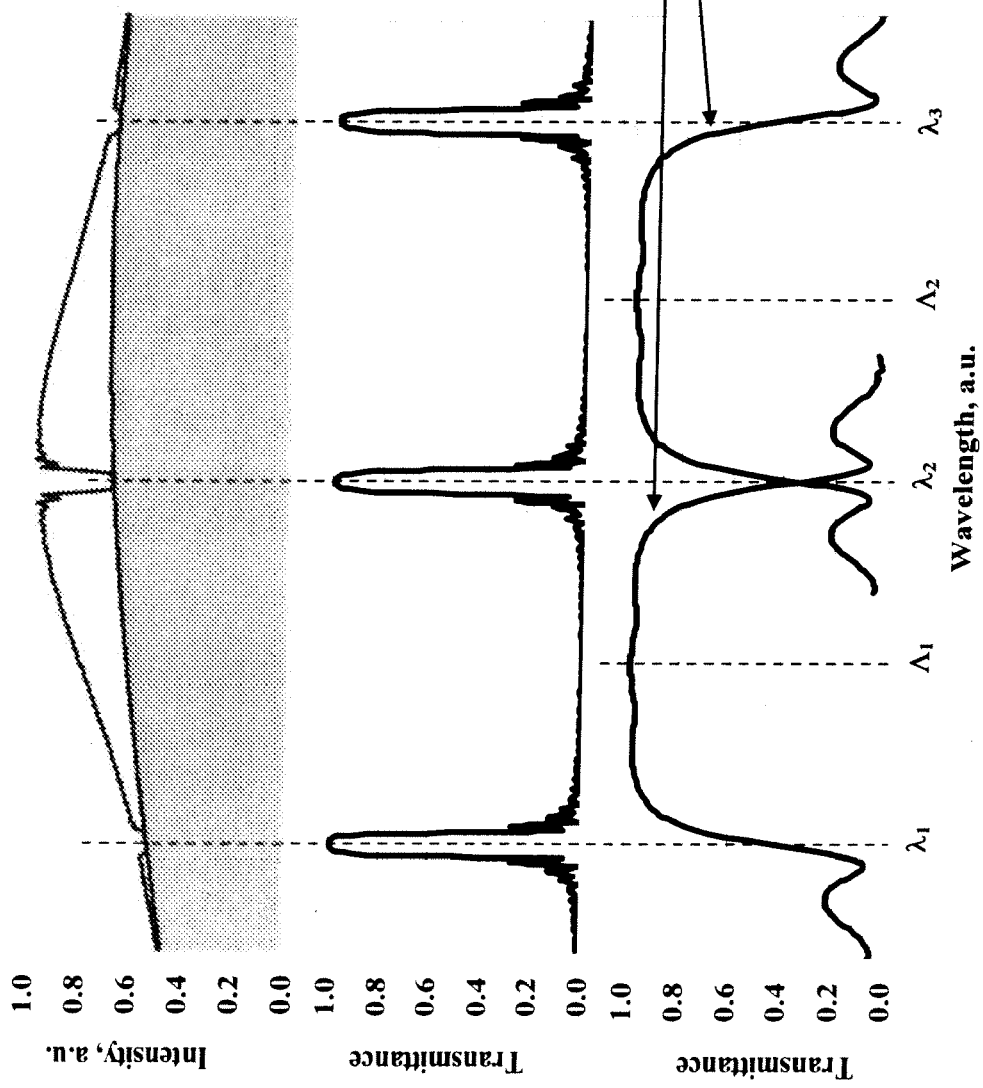
FIG. 4a shows a spectrum of a received communication signal including an acquired noise.
FIG. 4b shows a combined wavelength response of narrowband selecting filters shown in FIG. 2.
FIG. 4c shows overlaying respective wavelength responses of selecting filters shown in FIG. 2.

A receiver receives the propagated communication signal. The received communication signal includes a noise acquired as it was propagated and/or received (see, for example, FIG. 4a). As shown in FIG. 4a, the acquired noise has a spectral density that is wavelength-dependent. That is, an intensity of the acquired noise at one wavelength (e.g., $\lambda_1$) may be different relative to an intensity of the acquired noise at another wavelength (e.g., $\lambda_2$). Referring back to FIG. 2, the received communication signal is then input to a plurality of narrowband selecting filters 30.

Similar to the rejection filters 20, in one embodiment of the present invention, each of the narrowband selecting filters 30 is a narrowband filter. In one embodiment of the present invention, the narrowband selecting filters 30 may include thick Bragg gratings.

The narrowband selecting filters 30 have a combined wavelength response (see, for example, FIG. 4b). The narrowband selecting filters 30 are adapted to pass certain wavelengths and to reject other wavelengths. The wavelengths that are passed respectively correspond to spectra centers of the narrowband selecting filters 30. The spectra centers of the narrowband selecting filters 30 substantially correspond to the spectra centers of the rejection filters 20, respectively. As shown in FIG. 4b, the narrowband selecting filters 30 are adapted to pass wavelengths $\lambda_1$, $\lambda_2$, and $\lambda_3$, respectively, and to reject wavelengths other than $\lambda_1$, $\lambda_2$, and $\lambda_3$. Because, prior to propagation, the communication signal, as filtered by the rejection filters 20, had spectral holes at the wavelengths $\lambda_1$, $\lambda_2$, and $\lambda_3$, it is assumed that content of the received communication signal at the wavelengths $\lambda_1$, $\lambda_2$, and $\lambda_3$ are substantially attributable to the acquired noise. In other words, it is assumed that the communication signal, as filtered by the rejection filters 20, lacks content at the spectral holes.

Referring back to FIG. 2, an output of the narrowband selecting filters 30 is then measured. In more detail, the output of the narrowband selecting filters 30 is measured using a plurality of detectors 50, each of which is adapted to measure an intensity of a signal component of one or more wavelengths. In one embodiment of the present invention, the detectors 50 include a spectrometer. In one embodiment of the present invention, the detectors 50 include an analog spectrum analyzer and/or a digital spectrum analyzer. However, embodiments of the present invention are not limited to the examples described above. That is, any of various suitable devices used to examine a spectral composition and/or to measure a power spectrum of an electrical, magnetic, acoustic, radio and/or optical waveform can be used as a detector or detectors of the detectors 50.

Figure 5:
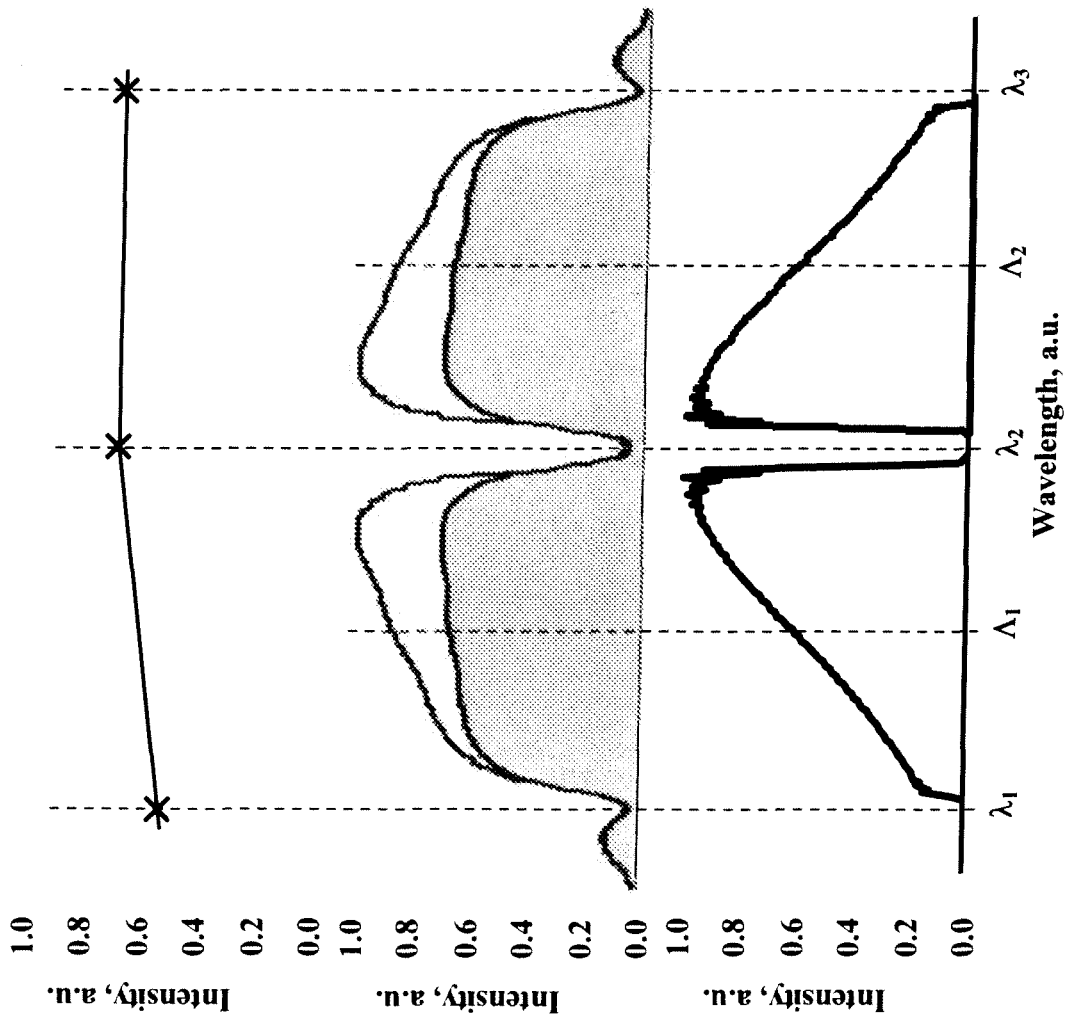
FIG. 5a shows a spectrum of a reconstruction of the acquired noise.
FIG. 5b shows a measurement of an output of the selecting filters.
FIG. 5c shows a result of subtracting the reconstructed noise from the output of the selecting filters.

By way of example, the detectors 50 are respectively adapted to measure intensities of the received communication signal (as filtered by the narrowband selecting filters 30) at the wavelengths $\lambda_1$, $\lambda_2$, and $\lambda_3$ (see, for example, FIG. 5a). The measured intensities corresponding to the wavelengths $\lambda_1$, $\lambda_2$, and $\lambda_3$ are then used as reference points to determine (or reconstruct) the acquired noise across a certain wavelength range which includes the wavelengths $\lambda_1$, $\lambda_2$, and $\lambda_3$.

As shown in FIG. 2, a restorer 70 is used for determining a spectrum of the acquired noise. By way of example, as shown in FIG. 5a, linear interpolation can be used to determine a portion of the acquired noise corresponding to a wavelength range defined by any two of the reference points. (As would be expected, basing a linear interpolation on two adjacent reference points is likely to produce more accurate results than basing a linear interpolation on two non-adjacent reference points.) That is, linear interpolation can be used to determine a portion of the acquired noise corresponding to wavelengths ranging from $\lambda_1$ to $\lambda_2$ using the measured intensities of the received communication signal at the wavelengths $\lambda_1$ and $\lambda_2$. Similarly, linear interpolation can be used to determine a portion of the acquired noise corresponding to wavelengths ranging from $\lambda_2$ to $\lambda_3$ using the measured intensities of the received communication signal at the wavelengths $\lambda_2$ and $\lambda_3$. As shown in FIG. 2, the restorer 70 can thereby reconstruct (or restore) the spectrum of the acquired noise across a range of wavelengths spanning from $\lambda_1$ to $\lambda_3$. The reconstructed spectrum of the acquired noise is input to a subtractor 80.

Although FIG. 5a illustrates using linear interpolation to reconstruct the acquired noise, embodiments of the present invention are not limited to this particular illustration. Other embodiments of the present invention may use suitable interpolative techniques that may be more mathematically complex. By way of example, polynomial interpolation, spline interpolation, and/or other forms of interpolation may also be used.

Apart from the measurements described above, a second set of measurements based on the received communication signal is also performed. The second set of measurements may be derived by measuring intensities of the received communication signal across a single wavelength range—e.g., a single spectral interval starting at $\lambda_1$ and ending at $\lambda_3$. Alternatively, the second set of measurements may be derived by dividing the single wavelength range into a plurality of subranges (or spectral sub-intervals) and then measuring intensities of the received communication signal in each of the subranges.

In the alternative situation, as shown in FIG. 2, the received communication signal is input to a plurality of selecting filters 40. Each of the selecting filters 40 has a corresponding passband and a corresponding center wavelength (see, for example, FIG. 4c). The passband of one of the selecting filters 40 includes wavelengths that are passed substantially unaltered by the one of the selecting filters 40, and its center wavelength corresponds to a wavelength substantially at a center of the passband.

As shown in FIG. 4c, one of the selecting filters 40 has a passband including wavelengths spanning from $\lambda_1$ to $\lambda_2$ and has a center wavelength corresponding to a wavelength $\Lambda_1$. As also shown in FIG. 4c, another of the selecting filters 40 has a passband including wavelengths spanning from $\lambda_2$ to $\lambda_3$ and has a center wavelength corresponding to a wavelength $\Lambda_2$. As shown in FIGS. 4b and 4c, the selecting filters 40 have wider passbands (or are higher in bandwidth) than the narrowband selecting filters 30. An output of the selecting filters 40 is shown in FIG. 5b.

Referring back to FIG. 2, the output of the selecting filters 40 is then measured. In more detail, the output of the selecting filters 40 is measured using a plurality of detectors 60, each of which is adapted to measure an intensity of a signal component of one or more wavelengths. In one embodiment of the present invention, the detectors 60 include a spectrometer. In one embodiment of the present invention, the detectors 60 include an analog spectrum analyzer and/or a digital spectrum analyzer.

By way of example, the detectors 60 are respectively adapted to measure intensities of the received communication signal (as filtered by the selecting filters 40) at the wavelengths $\Lambda_1$ and $\Lambda_2$ (see, for example, FIG. 5b). As shown in FIG. 5b, a first detector of the detectors 60 is tuned to measure intensities of the received communication signal at and around the wavelength $\Lambda_1$. In more detail, the first detector is tuned to measure intensities of the received communication signal at the wavelength $\Lambda_1$ and at certain wavelengths also corresponding to the passband of the one of the selection filters 40—i.e., wavelengths ranging from $\lambda_1$ to $\lambda_2$ (see, for example, FIG. 4c.) The measured intensities of the first detector are input to the subtractor 80 (see, for example, FIG. 2.)

As shown in FIG. 2, the subtractor 80 receives the reconstructed spectrum of the acquired noise from the restorer 70 and the measured intensities of the detectors 60. Further to the example described above, the subtractor 80 receives from the restorer 70 the reconstructed portion of the acquired noise corresponding to wavelengths ranging from $\lambda_1$ to $\lambda_2$. The subtractor 80 also receives from the detectors 60 the intensities of the received communication signal at wavelengths ranging from $\lambda_1$ to $\lambda_2$, as measured by the first detector of the detectors 60. For each of a plurality of wavelengths, the subtractor 80 subtracts a corresponding intensity of the reconstructed acquired noise from a corresponding measured intensity of the received communication signal. By way of example, the subtractor 80 subtracts an intensity of the reconstructed acquired noise at the wavelength $\Lambda_1$ from a measured intensity of the received communication signal at the wavelength $\Lambda_1$. The subtractor thereby outputs a result corresponding to a determination of an intensity of the communication signal at the wavelength $\lambda_1$, as propagated in a substantially noiseless environment.

Similarly, a second detector of the detectors 60 is tuned to measure intensities of the received communication signal at and around the wavelength $\Lambda_2$. In more detail, the second detector is tuned to measure intensities of the received communication signal at the wavelength $\Lambda_2$ and at certain wavelengths also corresponding to the passband of the another of the selection filters 40—i.e., wavelengths ranging from $\lambda_2$ to $\lambda_3$ (see, for example, FIG. 4c.) The measured intensities of the second detector are input to the subtractor 80 (see, for example, FIG. 2.)

The subtractor 80 receives from the restorer 70 the reconstructed portion of the acquired noise corresponding to wavelengths ranging from $\lambda_2$ to $\lambda_3$. The subtractor 80 also receives from the detectors 60 the intensities of the received communication signal at wavelengths ranging from $\lambda_2$ to $\lambda_3$, as measured by the second detector of the detectors 60. For each of a plurality of wavelengths, the subtractor 80 subtracts a corresponding intensity of the reconstructed acquired noise from a corresponding measured intensity of the received communication signal. By way of example, the subtractor 80 subtracts an intensity of the reconstructed acquired noise at the wavelength $\Lambda_2$ from a measured intensity of the received communication signal at the wavelength $\Lambda_2$. The subtractor 80 thereby outputs a result corresponding to a determination of an intensity of the communication signal at the wavelength $\Lambda_2$, as propagated in a substantially noiseless environment.

By subtracting portions of the reconstructed acquired noise from spectral sub-intervals of the received communication signal, as described above, a determination of intensities of the communication signal, as propagated in a substantially noiseless environment, can be produced. That is, as shown in FIG. 2, a spectrum of a clear signal 90 (e.g., a signal that is propagated in a substantially noiseless environment) can be derived. The spectrum of the clear signal 90 is shown in FIG. 5c. As shown in FIG. 5c, the spectrum of the clear signal 90 substantially approximates that of the communication signal, as filtered by the rejection filters 20 prior to propagation (see, for example, FIG. 3c).

Figure 6:
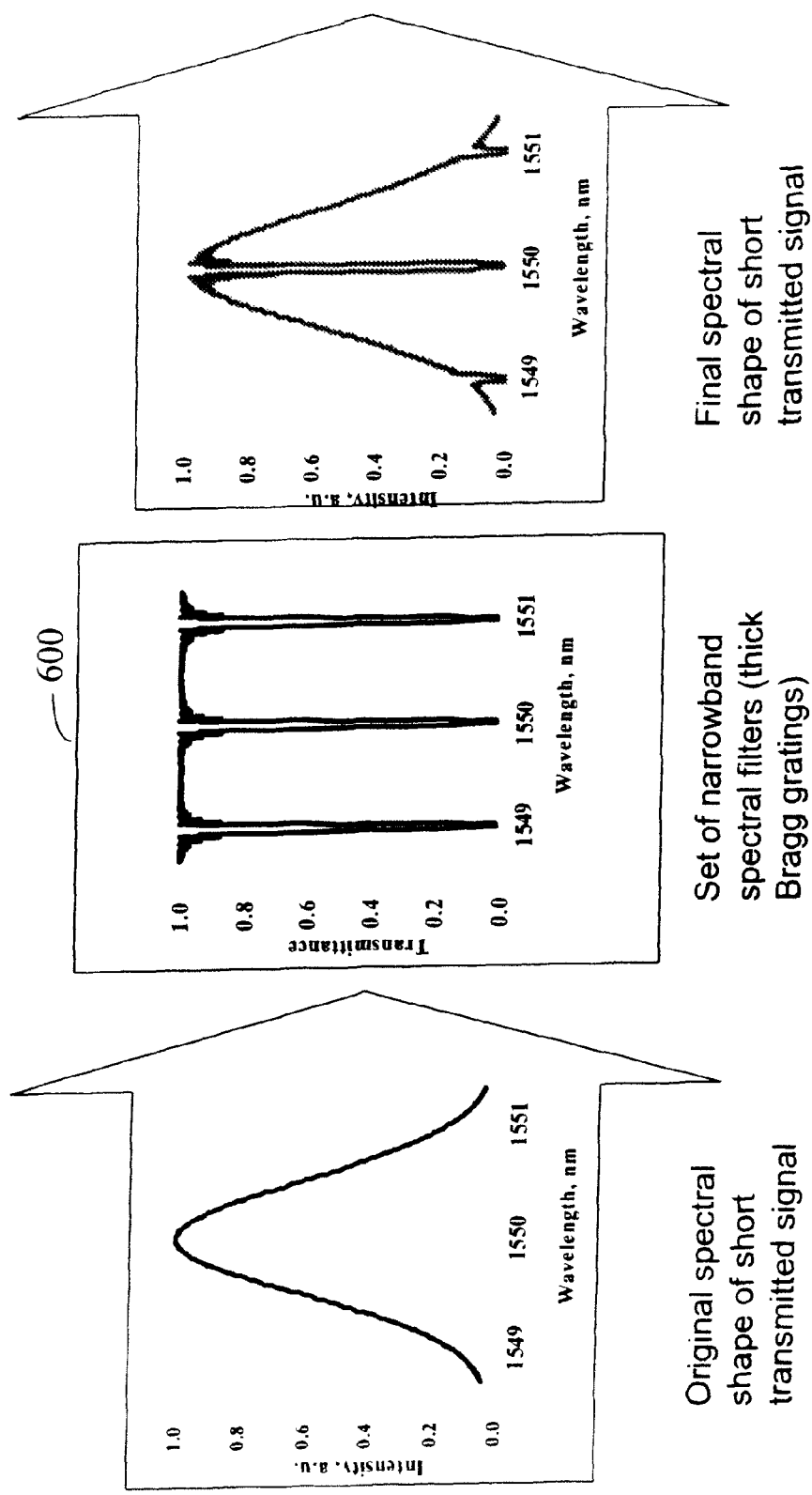
FIG. 6 shows a processing of signals transmitted by a system according to an embodiment of the present invention.

As described above, embodiments of the present invention may be used to suppress noise of received signals propagated over an environment in which noise is present. As shown in FIG. 6, a communication signal is first input to a plurality of narrowband spectral filters 600. The narrowband spectral filters are substantially similar to the rejection filters 20 shown in FIG. 2. By way of example, the narrowband spectral filters 600 are adapted to reject certain wavelengths—e.g., 1549, 1550 and 1551 nm. As shown in FIG. 6, an output of the narrowband spectral filters 600 has spectral holes corresponding to the certain wavelengths. The communication signal, as filtered by the narrowband spectral filters 600, is then propagated over a noisy environment.

The propagated signal is then received. The received signal includes noise content attributable to noise acquired when it was propagated and/or received. The received signal is input to a plurality of selecting filters 710 and a plurality of narrowband selecting filters 720 (see, for example, FIG. 7). The narrowband selecting filters 720 are substantially similar to the narrowband selecting filters 30 shown in FIG. 2. The narrowband selecting filters 720 are adapted to pass (or select) certain wavelengths and to reject other wavelengths. The wavelengths passed by the narrowband selecting filters 720 substantially correspond to wavelengths rejected by the narrowband spectral filters 600. That is, the narrowband selecting filters 720 pass content that is substantially attributable to the acquired noise.

Figure 7:
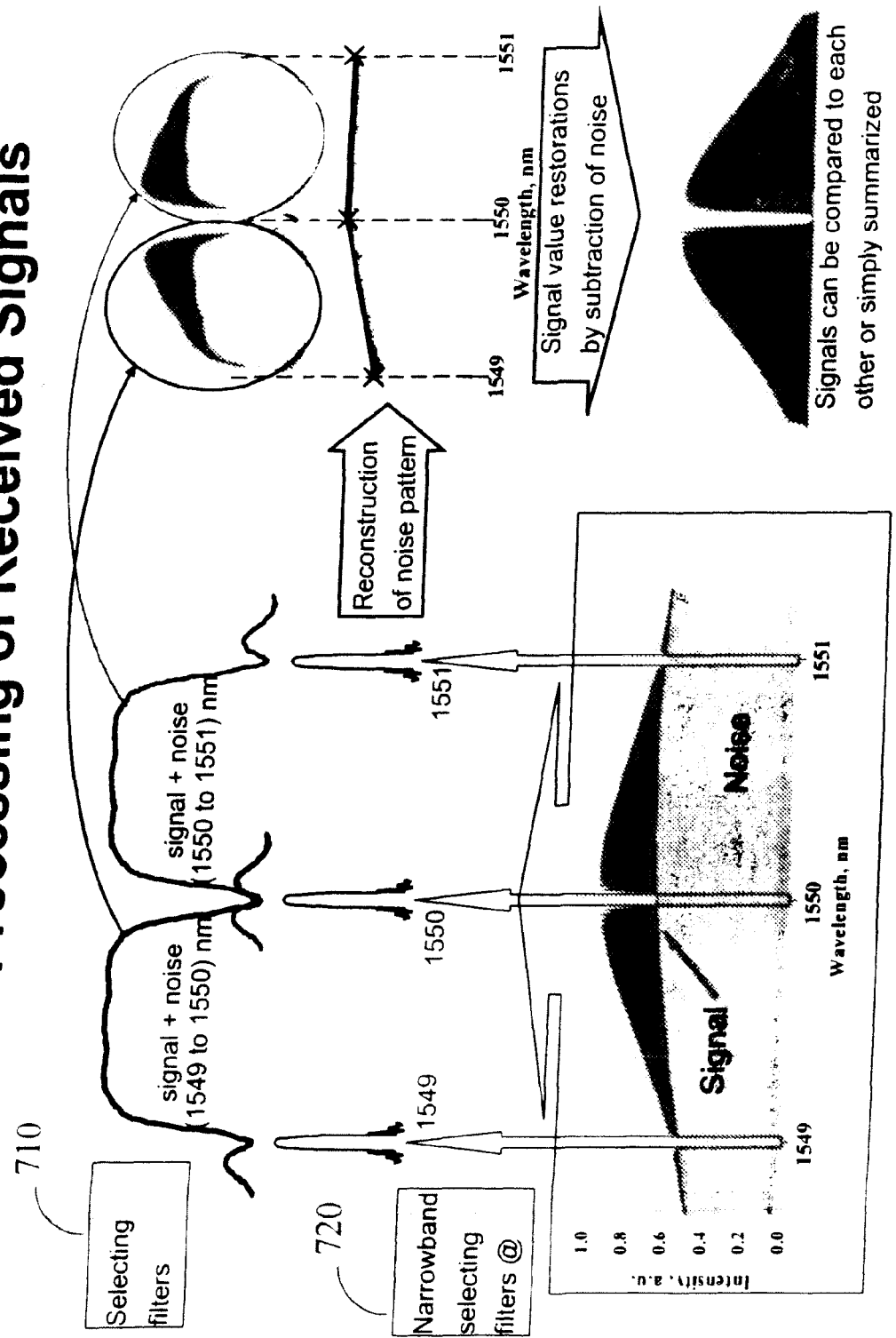
FIG. 7 shows a processing of signals received by the system.

As shown in FIG. 7, the narrowband selecting filters 720 pass the wavelengths 1549, 1550 and 1551 nm. Similar to the measurements performed by the detectors 50 shown in FIG. 2, intensities of the wavelengths passed by the narrowband selecting filters 720 are then measured and used as reference points. Similar to the reconstruction performed by the restorer 70 shown in FIG. 2, the reference points are used to restore a spectrum of the acquired noise via an interpolative technique (or techniques). By way of example, measured intensities corresponding to the wavelengths 1549 nm and 1550 nm are used to restore a portion of the spectrum of the acquired noise corresponding to a wavelength range spanning from 1549 to 1550 nm.

As described above, the received signal is also input to the selecting filters 710. The selecting filters 710 are substantially similar to the selecting filters 40 shown in FIG. 2. As shown in FIG. 7, one of the selecting filters 710 has a passband including wavelengths spanning from 1549 to 1550 nm, and another of the selecting filters 710 has a passband including wavelengths spanning from 1550 to 1551 nm. Similar to the measurements performed by the detectors 60 shown in FIG. 2, intensities of the received signal (as filtered by the selecting filters 710) are measured. By way of example, intensities of the received signal corresponding to wavelengths in the passband of the one of the selecting filters 710 (i.e., 1549 to 1550 nm) are measured.

Similar to the subtraction performed by the subtractor 80 shown in FIG. 2, the portion of the spectrum of the acquired noise corresponding to the wavelength range spanning from 1549 nm to 1550 nm is then subtracted from the measured intensities of the received signal corresponding to wavelengths in the range spanning from 1549 to 1550 nm. A portion of the spectrum of the communication signal, as propagated and received in a noiseless environment, is thereby determined, the portion corresponding to wavelengths ranging from 1549 to 1550 nm.

Similarly, measured intensities of the received signal (as filtered by the narrowband selecting filters 720) corresponding to the wavelengths 1550 nm and 1551 nm are used to restore a portion of the spectrum of the acquired noise corresponding to a wavelength range spanning from 1550 to 1551 nm. As described earlier, the another of the selecting filters 710 has the passband including wavelengths spanning from 1550 to 1551 nm. Intensities of the received signal corresponding to wavelengths in the passband of the another of the selecting filters 710 (i.e., 1550 to 1551 nm) are measured.

The portion of the spectrum of the acquired noise corresponding to the wavelength range spanning from 1550 nm to 1551 nm is then subtracted from the measured intensities of the received signal corresponding to wavelengths in the range spanning from 1550 to 1551 nm. A portion of the spectrum of the communication signal, as propagated and received in a noiseless environment, is thereby determined, the portion corresponding to wavelengths ranging from 1550 to 1551 nm.

The determined portions of the spectrum of the communication signal are then combined to produce the spectrum of the communication signal ranging from 1549 nm to 1551 nm.

Figure 8:
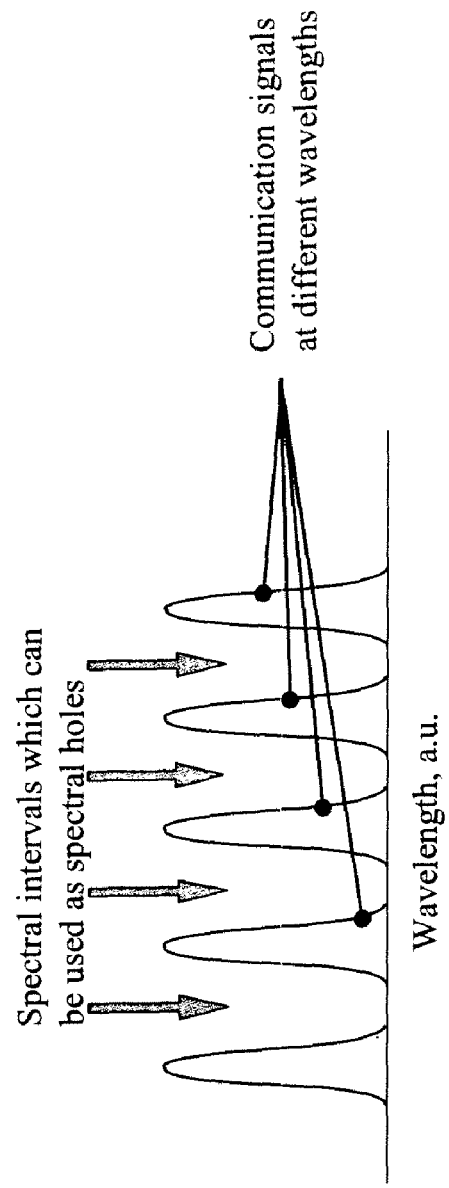
FIG. 8 shows a spectrum of a communication signal of a multi-channel communications system.

In another embodiment of the present invention, it may not be necessary to create spectral holes in a communication signal prior to propagation by using filters such as the rejection filters 20 and the narrowband spectral filters 600 respectively shown in FIGS. 2 and 6. In the case of multi-channel communications, a communication signal includes a series of channels, each of which has a center wavelength and a narrow bandwidth. FIG. 8 shows a spectrum of a multi-channel communication signal. As shown in FIG. 8, the spectrum of the multi-channel communication signal includes spectral intervals located at certain wavelengths between the wavelengths of communication signal channels. The spectral intervals can be used as spectral holes. Because the spectrum of the multi-channel communication signal includes the spectral holes, additional filtering of the signal is not required prior to propagation of the signal.

Figure 9:
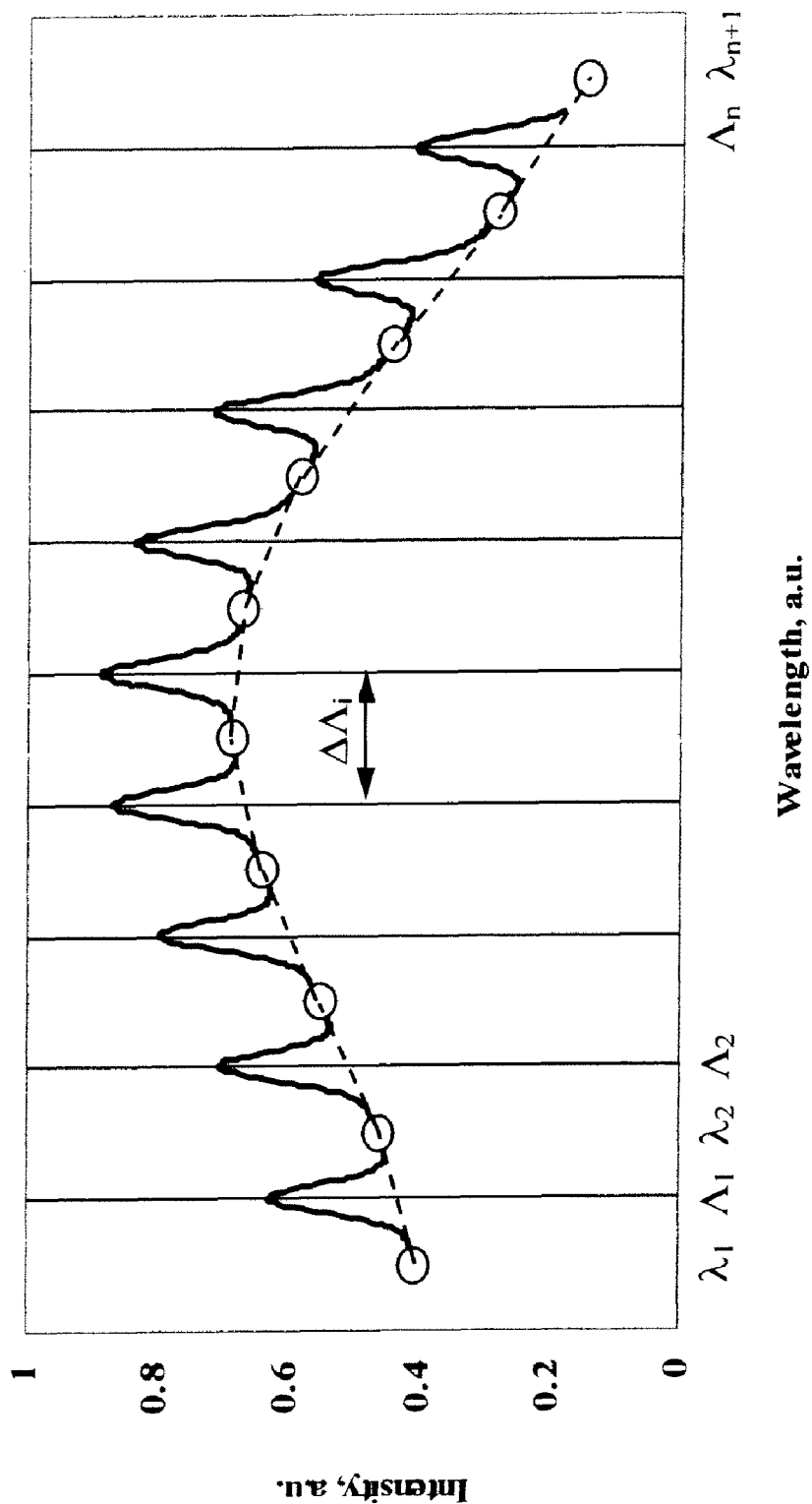
FIG. 9 shows a spectrum of the communication signal shown in FIG. 8, the communication signal having been propagated through an environment in which noise is present.

FIG. 9 shows a spectrum of a multi-channel communication signal received after it has been propagated through a noisy environment. As shown in FIG. 9, the received multi-channel signal includes a series of channels. Each channel in the series of channels has a corresponding center wavelength (e.g., $\Lambda_1$, $\Lambda_2$) and a corresponding bandwidth that is not wider than a corresponding gap bandwidth $\Delta\Lambda_i$. Because, prior to propagation, a corresponding multi-channel communication signal (see, for example, FIG. 8) lacked content at certain wavelengths (e.g., $\lambda_1, \ldots, \lambda_{n+1}$ in FIG. 9), it may be assumed that content of the received multi-channel signal at the certain wavelengths is substantially attributable to an acquired noise. Therefore, measured intensities of the received signal at the certain wavelengths can be used as reference points. As previously described, the reference points (see, for example, circled portions of the received signal in FIG. 9), can be used to reconstruct a spectrum of an acquired noise (see, for example, the dotted-line waveform in FIG. 9) across a spectrum of the received signal. As also previously described, the reconstructed noise can then be subtracted from measured intensities of the received signal to derive a spectrum of a clear signal similar to the clear signal 90 shown in FIG. 2.

According to embodiments of the present invention, spectral suppression of noise in a communication signal enables measurement of the signal even under strong noise conditions (e.g., conditions that cause signals having a small signal-to-noise ratio to be received). The spectral suppression of noise also provides an accurate receiving of the signal because both the signal itself and an acquired noise are measured using a same system—i.e., at a same time and through a same receiving aperture. Therefore, the reconstructed noise is based on actual noise received.

An accuracy of a receiver can be improved by comparing portions of the signal corresponding to different spectral regions to each other and also by increasing the number of narrowband filters to create more spectral holes which, in turn, enable a more accurate reconstruction of the acquired noise. In addition, the application of narrowband filters that have narrower passbands is used because such filters influence a total energy and a temporal shape of a signal to be filtered and then propagated to a smaller degree.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for spectral suppression of a noise in a communication signal, the method comprising:
   processing a communication signal through a plurality of rejection filters to create a plurality of spectral holes over a spectrum of the communication signal, signal content of portions of the communication signal being rejected in the spectral holes;
   transmitting the processed communication signal;
   receiving the processed communication signal with an acquired noise that is acquired after creating the plurality of spectral holes;
   measuring noise intensities of the acquired noise at the plurality of spectral holes;
   calculating of the acquired noise over the spectrum of the communication signal;
   subtracting the acquired noise from the processed communication signal with the acquired noise; and
   summarizing the signal content of portions of the processed communication signal between the plurality spectral holes.

2. The method of claim 1, wherein a spectrum of the acquired noise is restored using the measured noise intensities as reference points of the spectrum of the acquired noise.

3. The method of claim 2, wherein the spectrum of the acquired noise is restored using a linear interpolation technique.

4. The method of claim 1, wherein the measuring of the noise intensities comprises passing the processed communication signal with the acquired noise through a plurality of selecting filters.

5. The method of claim 4, wherein the plurality of selecting filters have spectra centers substantially corresponding to spectra centers of the plurality of rejection filters.

6. The method of claim 4, wherein the noise intensities are measured using a plurality of detectors adapted to measure the noise intensities inside the spectral holes where the communication signal is absent.

7. The method of claim 1, further comprising:
   measuring the processed communication signal with the acquired noise after receiving the processed communication signal with the acquired noise,
   wherein the spectrum of the acquired noise is restored using the measured noise intensities as a plurality of reference points of the spectrum of the acquired noise,
   wherein the plurality of reference points comprises a starting point and an ending point, and wherein the processed communication signal is measured as a single spectral interval from the starting point to the ending point.

8. The method of claim 1, further comprising:
measuring the processed communication signal with the acquired noise after receiving the processed communication signal with the acquired noise,
wherein the processed communication signal is measured in a plurality of spectral intervals by passing the processed communication signal through a plurality of filters.

9. The method of claim 8, further comprising
calculating values of the acquired noise inside each of the plurality of spectral intervals.

10. The method of claim 9, wherein the subtracting the acquired noise from the processed communication signal with the acquired noise comprises subtracting the values of the acquired noise inside each of the plurality of spectral intervals from corresponding values of the processed communication signal inside each of the plurality of spectral intervals.

11. The method of claim 1, further comprising:
measuring the processed communication signal with the acquired noise after receiving the processed communication signal with the acquired noise,
wherein the measuring of the noise intensities comprises passing the processed communication signal with the acquired noise through a plurality of narrowband selecting filters, and
wherein the measuring of the processed communication signal comprises passing the processed communication signal with the acquired noise through a plurality of filters higher in bandwidth than the plurality of narrowband selecting filters.

12. The method of claim 1, wherein each of the plurality of the rejection filters is a narrowband filter.

13. The method of claim 1, wherein the plurality of the rejection filters comprise a plurality of Bragg gratings.

14. A method for noise suppression in multi-channel communication at different communication wavelength intervals, the method comprising:
processing each of a plurality of communication signals at different wavelengths separated by a plurality of wavelength intervals through at least one rejection filter to create at least one spectral hole over a spectrum of each of the communication signals, signal content of a portion of the spectrum being rejected in the at least one spectral hole;
transmitting each of the processed communication signals;
receiving each of the processed communication signals with an acquired noise that is acquired after creating the at least one spectral hole;
measuring at least one noise intensity of the acquired noise at the at least one spectral hole;
calculating of the acquired noise over the spectrum of each of the communication signals;
subtracting the acquired noise from each of the processed communication signals with the acquired noise; and
summarizing each of the processed communication signals at different wavelengths separated by the plurality of wavelength intervals.

15. A system for spectral suppression of a noise in a communication signal, the system comprising:
a plurality of rejection filters;
a transmitter adapted to process a communication signal through the plurality of rejection filters to create a plurality of spectral holes over a spectrum of the communication signal, signal content of portions of the spectrum being rejected in the spectral holes, and to transmit the processed communication signal; and
a plurality of detectors adapted to receive the processed communication signal with an acquired noise, to measure noise intensities inside the spectral holes where the communication signal is absent, and to summarize signal content of portions of the processed communication signal between the spectral holes.

16. The system of claim 15, further comprising:
a plurality of narrowband selecting filters adapted to receive the processed communication signal with an acquired noise that is acquired after creating the spectral holes and to select portions of the acquired noise from the processed communication signal with the acquired noise.

17. The system of claim 16, wherein the plurality of narrowband selecting filters have spectra centers substantially corresponding to spectra centers of the plurality of rejection filters.

18. The system of claim 16, further comprising:
a plurality of filters higher in bandwidth than the plurality of narrowband selecting filters, wherein the processed communication signal is measured in a plurality of spectral intervals by passing the communication through the plurality of filters higher in bandwidth than the plurality of narrowband selecting filters.

19. The system of claim 15, wherein the plurality of the rejection filters comprise a plurality of Bragg gratings.

20. A system for spectral suppression of a noise in a communication signal, the system comprising:
means for processing a communication signal to create a plurality of spectral holes over a spectrum of the communication signal, signal content of portions of the spectrum being rejected in the spectral holes;
means for transmitting the processed communication signal;
means for receiving the processed communication signal with an acquired noise that is acquired after creating the plurality of spectral holes;
means for measuring noise intensities of the acquired noise at the plurality of spectral holes;
means for calculating of the acquired noise over the spectrum of the communication signal; and
means for subtracting the acquired noise from the processed communication signal.

* * * * *